US010989917B2

(12) United States Patent
Lambert et al.

(10) Patent No.: US 10,989,917 B2
(45) Date of Patent: Apr. 27, 2021

(54) POLARIZATION ROTATOR FOR HEAD-UP DISPLAY

(71) Applicant: Panasonic Automotive Systems Company of America, Division of Panasonic Corporation of North America, Peachtree City, GA (US)

(72) Inventors: David Kay Lambert, Sterling Heights, MI (US); Steven Craig Bower, Fayetteville, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 16/445,563

(22) Filed: Jun. 19, 2019

(65) Prior Publication Data

US 2019/0391388 A1 Dec. 26, 2019

Related U.S. Application Data

(60) Provisional application No. 62/687,371, filed on Jun. 20, 2018.

(51) Int. Cl.
| G09G 5/00 | (2006.01) |
| G02B 27/01 | (2006.01) |
| G02B 27/28 | (2006.01) |
| G09G 3/36 | (2006.01) |
| B60K 35/00 | (2006.01) |

(52) U.S. Cl.
CPC ......... *G02B 27/0101* (2013.01); *B60K 35/00* (2013.01); *G02B 27/286* (2013.01); *G09G 3/36* (2013.01); *B60K 2370/1529* (2019.05); *B60K 2370/31* (2019.05); *B60K 2370/33* (2019.05); *B60K 2370/334* (2019.05); *G09G 2380/10* (2013.01)

(58) Field of Classification Search
CPC .... G02B 27/0101; G02B 27/286; G09G 3/36; G09G 2380/10; B60K 35/00; B60K 2370/334; B60K 2370/1529; B60K 2370/33; B60K 2370/31; B60K 2370/333; B60K 37/00
See application file for complete search history.

(56) References Cited

U.S. PATENT DOCUMENTS

2013/0279016 A1* 10/2013 Finger ................ G02B 27/0101
359/630
2018/0321523 A1* 11/2018 Robinson .............. G02F 1/1323

* cited by examiner

*Primary Examiner* — Adam R. Giesy
(74) *Attorney, Agent, or Firm* — Laurence S. Roach, Esq.

(57) ABSTRACT

A head up display arrangement for a motor vehicle includes a head up display module having a picture generation unit emitting a light field. A plurality of linear polarizers are arranged in a stack. A first of the linear polarizers receives the light field from the picture generation unit. A last of the linear polarizers emits the light field. A windshield reflects the light field from the last linear polarizer such that the reflected light field is visible to a human driver of the motor vehicle as a virtual image.

16 Claims, 3 Drawing Sheets

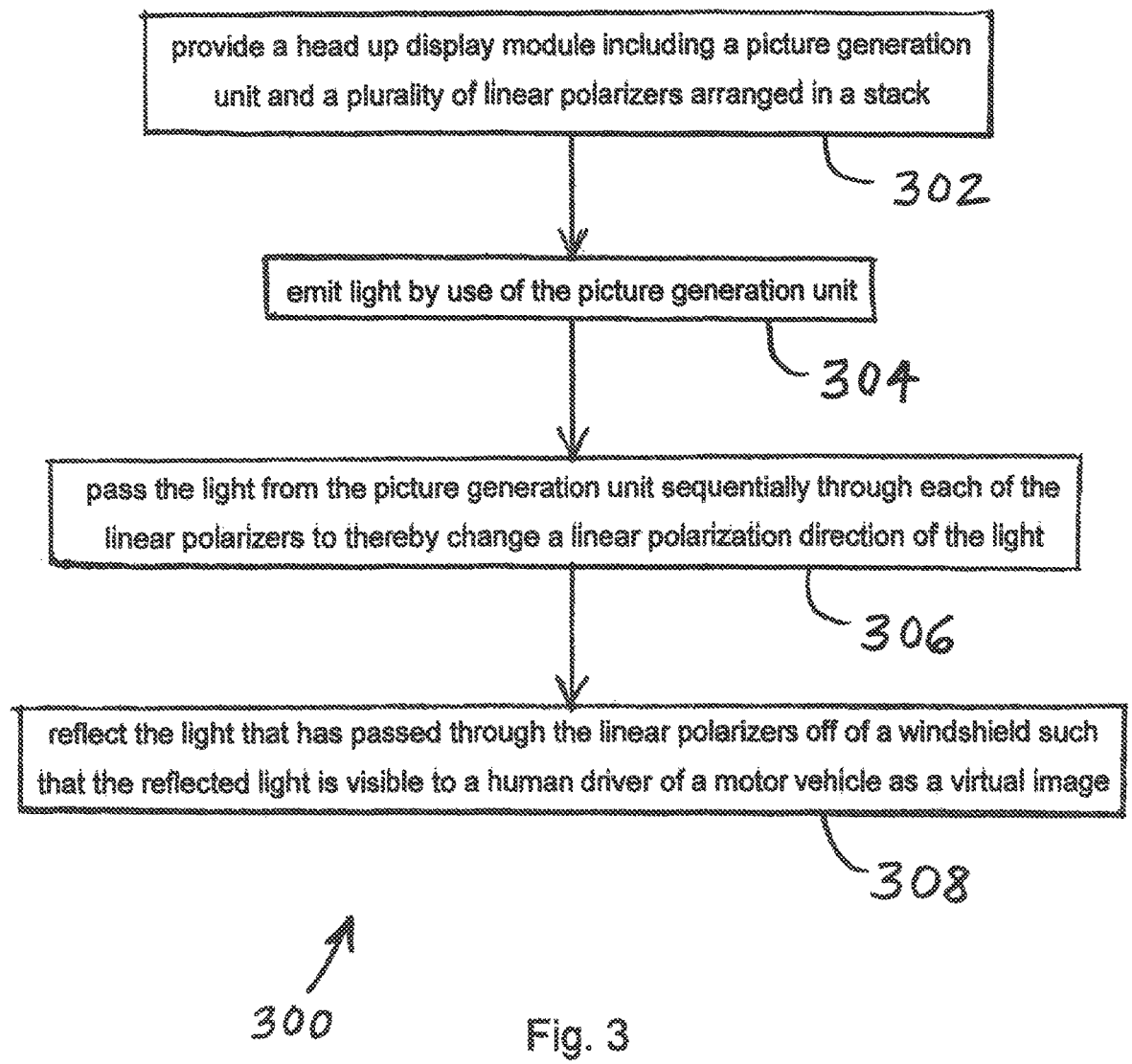

POLARIZATION ROTATOR FOR HEAD-UP DISPLAY

CROSS-REFERENCED TO RELATED APPLICATIONS

This application claims benefit of U.S. Provisional Application No. 62/687,371 filed on Jun. 20, 2018, the disclosure of which is hereby incorporated by reference in its entirety for all purposes.

FIELD OF THE INVENTION

The disclosure relates to a head up display (HUD) in a motor vehicle.

BACKGROUND OF THE INVENTION

A head up display emits light that reflects from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the minors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

With a conventional windshield HUD, the driver needs to view a virtual image created by reflecting light from the windshield. The image source is a projector beneath the top of the instrument panel. The light is incident on the windshield near the Brewster angle, at which all p-polarized light is transmitted, so the reflection of s-polarized light is much higher than for p-polarized light. However, drivers often wear polarized sunglasses to avoid seeing reflected light from water on the road. The polarized sunglasses are oriented to primarily transmit p-polarized light. Thus, the HUD cannot simply project s-polarized light and still enable the driver to see the reflected light from the windshield.

Many current owners of HUD-equipped vehicles have expressed unhappiness with inability to view the HUD image while wearing polarized sunglasses. The following methods are known to enable the image of a windshield HUD to be viewed with polarized sunglasses: (1) The HUD projector emits circularly polarized or elliptically polarized light. This is not a fully satisfactory solution since the windshield reflectivity to p-polarized light is small; (2) The driver can wear non-polarizing sunglasses; (3) A plastic lens, including a wave plate, can be clipped over the polarizing sunglasses; and (4) An interior surface of the windshield can be coated with a reflective layer. Doing so increases windshield reflectance, and, as a result, increases veiling glare.

Currently, virtual images produced by head up displays become extremely dim when the user is wearing polarized sun glasses. In some instances, the virtual image completely disappears because the light coming towards the driver has a majority of its light in one polarization state.

There is no known solution to the problem of a dim virtual image. A driver wearing polarized sunglasses cannot see the virtual image produced by the HUD on a sunny day.

Circularly polarizing the light after the picture generation unit (PGU) may help slightly, but it does not solve the problem. It is known for a wave plate to be used to rotate the linear polarization direction of the light transmitted through the LCD or convert the transmitted light to circularly polarized light. Currently available retardation film that would be used for this application does not meet the temperature requirement for a HUD.

It is also known to design the LCD so the light that exits is linearly polarized with the desired polarization direction. However, to do so introduces a long lead time and the resultant LCD is a custom display that costs more.

P-polarized light has an electric field parallel to the plane of incidence. The plane of incidence is a plane which includes the direction of travel of the light and a vector perpendicular to the surface from which the light is being reflected. In contrast, S-polarized light has an electric field in the orthogonal direction, perpendicular to the plane of incidence.

SUMMARY

The present invention may provide a head up display (HUD) system that reflects light from the front windshield of a vehicle to be seen by the driver as a virtual image. In one embodiment, the system includes at least one additional optical element which enables the driver to see the virtual image when he is wearing polarized sunglasses.

The present invention may enable a head-up display (HUD) to provide a virtual image that is easily visible to a driver wearing polarized sunglasses, while displaying a bright image with the intended colors to a driver not wearing sunglasses. The invention may use a sequence of linear polarizers to rotate the linear polarization direction of light coming from a liquid crystal display (LCD). The invention may make it possible for a HUD to provide a virtual image with colors that closely match the colors provided by an LCD. The invention may make it possible to quickly tune the fraction of the light exiting the HUD that primarily contributes to image brightness as seen by a driver without sunglasses (s-polarized), as opposed to the fraction that contributes to image brightness as seen by a driver wearing polarized sunglasses (p-polarized).

The invention may convert a fraction of the s-polarized light from a LCD in the HUD to p-polarized light so a driver wearing polarized sunglasses is still able to see the virtual image created by reflecting light from the windshield. This invention may provide this function while maintaining the intended colors to be viewed by the driver.

In one embodiment, the invention comprises a head up display arrangement for a motor vehicle, including a head up display module having a picture generation unit emitting a light field. A plurality of linear polarizers are arranged in a stack. A first of the linear polarizers receives the light field from the picture generation unit. A last of the linear polarizers emits the light field. A windshield reflects the light field from the last linear polarizer such that the reflected light field is visible to a human driver of the motor vehicle as a virtual image.

In another embodiment, the invention comprises a head up display method, including providing a head up display module including a picture generation unit and a plurality of linear polarizers arranged in a stack. Light is emitted by use of the picture generation unit. The light from the picture generation unit is sequentially passed through each of the linear polarizers to thereby change a linear polarization direction of the light. The light that has passed through the linear polarizers is reflected off of a windshield such that the reflected light is visible to a human driver of a motor vehicle as a virtual image.

In yet another embodiment, the invention comprises a head up display arrangement for a motor vehicle, including a head up display module having a picture generation unit emitting light. A plurality of linear polarizers receive the light from the picture generation unit, sequentially change a linear polarization direction of the received light, and emit the light with a changed linear polarization direction. A windshield reflects the light from the linear polarizers such that the reflected light field is visible to a human driver of the motor vehicle as a virtual image.

An advantage of the present invention is that it solves the problem of the driver not being able to see the HUD virtual image while wearing ordinary polarizing sunglasses.

A further advantage of this invention is that reasonably priced polarizer material is available that withstands the upper temperature that a HUD must be able to withstand (105° C.). Such polarizer material is used in LCD construction. However, the upper temperature limit for polymer retarder film that can be used for a wave-plate is typically only 85° C. There are other means of constructing a wave-plate that are expected to withstand 105° C. such as evaporation of a film at an oblique angle on a substrate, but they are not currently available at low enough cost to be used in a HUD.

BRIEF DESCRIPTION OF THE DRAWINGS

A better understanding of the present invention will be had upon reference to the following description in conjunction with the accompanying drawings.

FIG. 3 is a flow chart of one embodiment of a head up display method of the present invention.

DETAILED DESCRIPTION OF THE PREFERRED EMBODIMENTS

Figure 1:
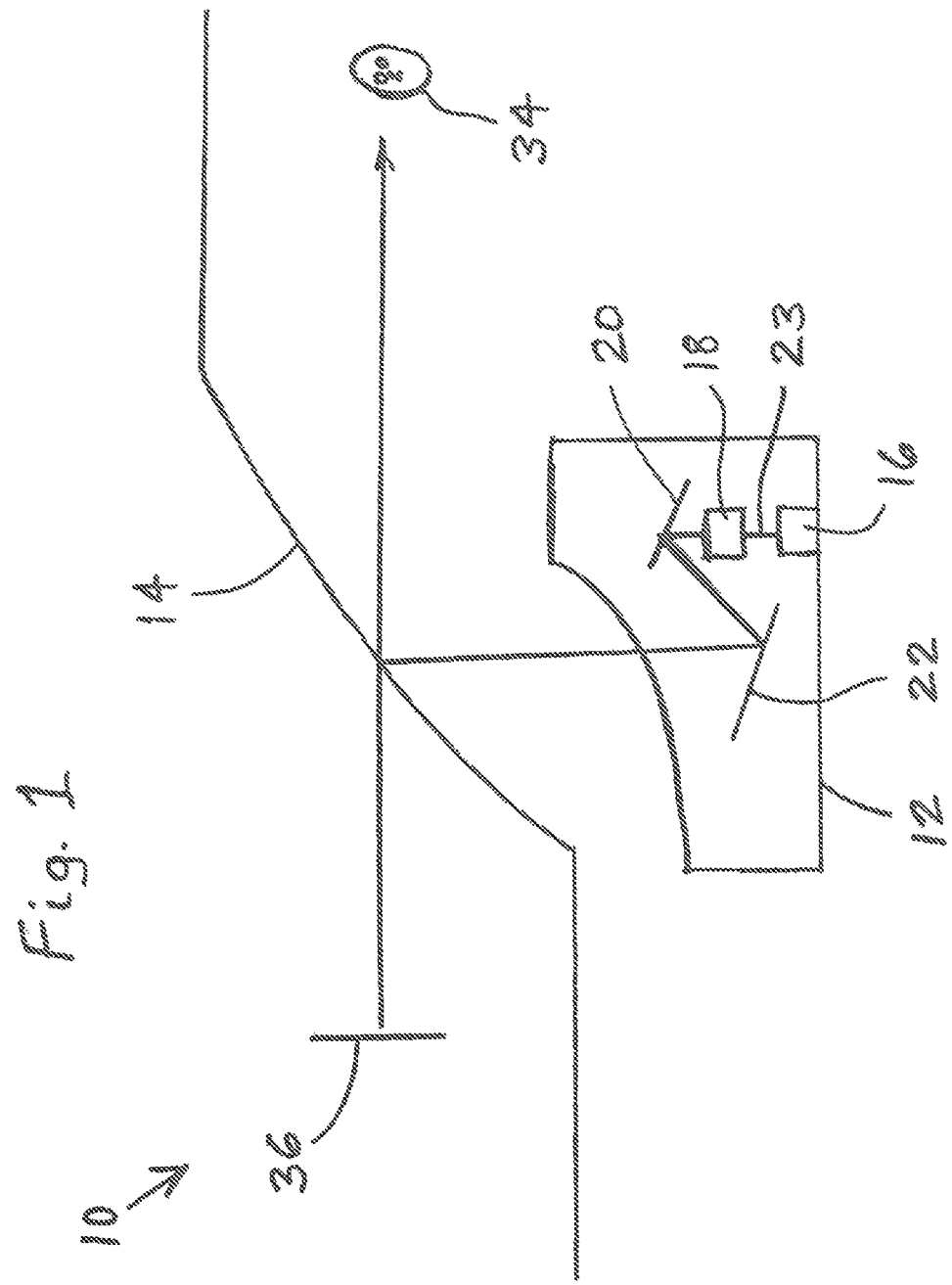
FIG. 1 is a schematic side view of one embodiment of an automotive head up display arrangement of the present invention.

FIG. 1 illustrates one embodiment of an automotive head up display arrangement 10 of the present invention, including a HUD module 12 and a windshield 14. HUD module 12 includes a PGU in the form of LCD 16, a polarizing device 18, a first mirror 20, and a second mirror 22. LCD 16 may transmit light 23 to polarizing device 18.

Figure 2:
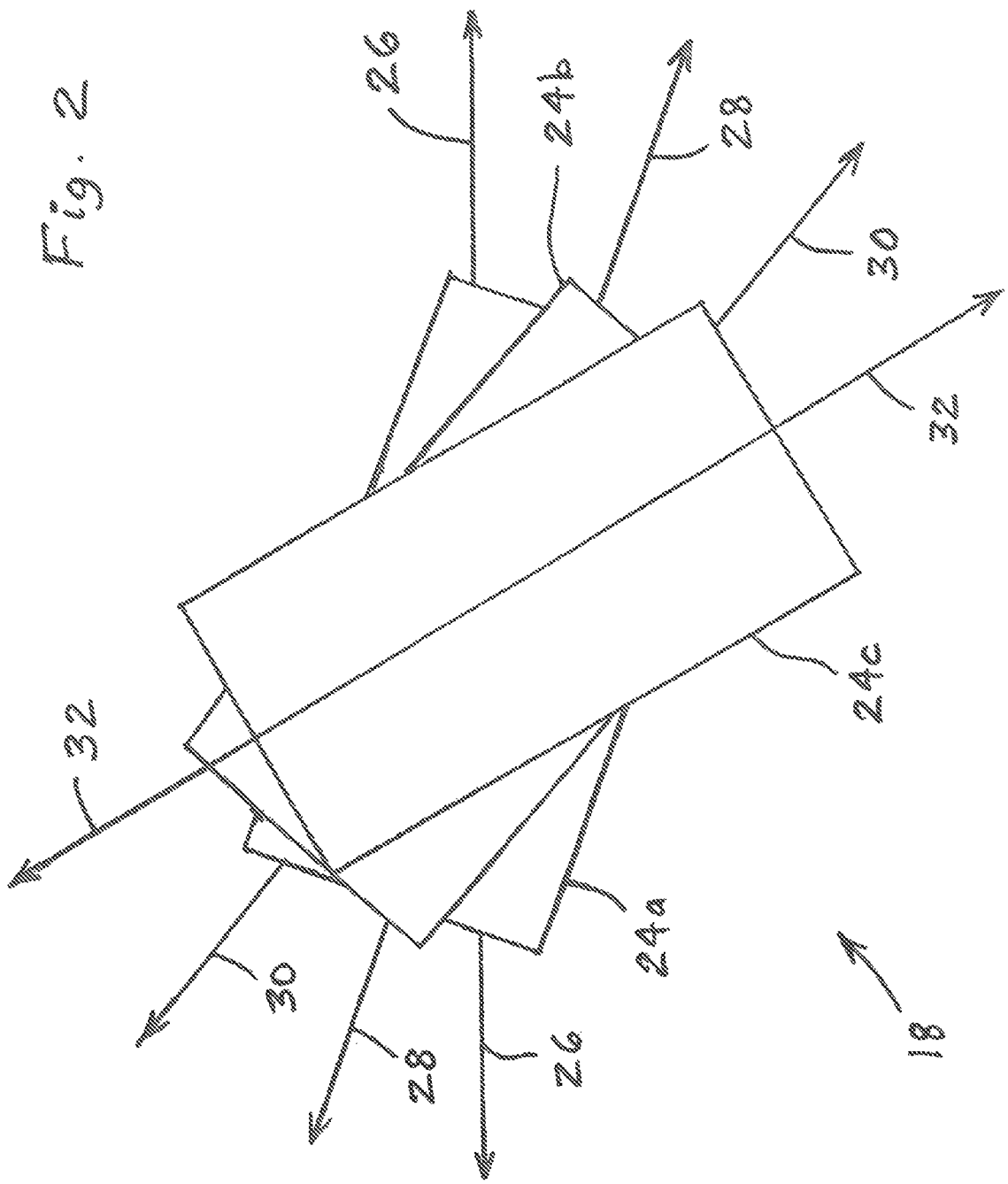
FIG. 2 is a plan view of one embodiment of the polarizing device of the automotive head up display arrangement of FIG. 1.

FIG. 2 illustrates one embodiment of polarizing device 18 including a polarization rotator having a stack of three linear polarizers or plane polarizers 24a-c which may change the linear polarization direction of light 23 after light 23 exits LCD 16. Each of polarizers 24a-c may have a planar shape, and polarizers 24a-c may be parallel to each other. A gap between the sequential layers provided by linear polarizers 24a-b may be filled with optically transparent material that matches the index of refraction of the polarizer film. Also, a gap between the sequential layers provided by linear polarizers 24b-c may be filled with optically transparent material that matches the index of refraction of the polarizer film. Respective polarization directions of the three successive polarizers 24a-c may be oriented approximately at the same incremental angle, as shown in FIG. 2.

An electric field direction of S-polarized light from LCD 16 is indicated by double arrow 26. An electric field direction after the light passes through first polarizer 24a is indicated by double arrow 28. An electric field direction after the light passes through second polarizer 24b is indicated by double arrow 30. An electric field direction after the light passes through third polarizer 24c is indicated by double arrow 32.

The polarization rotator shown in FIG. 2 includes multiple layers of plastic film linear polarizers. Each polarizer may be rotated by approximately the same angle relative to the previous polarizer. To avoid reflection loss at interfaces, the gap between sequential plastic film linear polarizers may be filled with an optically transparent material that has an index of refraction that matches the index of refraction of the polarizer film. The shape of the layers is shown in FIG. 2 as rotated rectangles for purposes of illustration. In reality, once the layers are properly arranged, they may be fused together and cut to the desired shape. For a HUD, the layers may be cut to the shape of the active area of the LCD.

The polarization rotator may maximize the fraction of incident light transmitted with the desired polarization direction. One source of loss is light reflected at interfaces. Typically, the total reflection loss from the front and back surfaces of individual plastic film polarizers is about 8%. For multiple polarizers stacked together, reflection loss between adjacent films can be eliminated by filling the gap between the layers with a transparent material that has the same index of refraction.

During use, light 23 from LCD 16 may be polarized by polarization rotator 18, and reflected by mirrors 20, 22 and windshield 14 toward a user 34. Light 23 may appear to user 34 as a virtual image 36 even when user 34 is wearing polarized sunglasses.

In another embodiment, two polarizers may be used. The first polarizer may be rotated 23 degrees, and the second polarizer may be rotated 46 degrees. Thus, the polarization direction of the light after passing through both polarizers may be rotated 46 degrees. In a specific embodiment with an LCD display emitting white light, the illuminance may be about 1037 cd/m². The color coordinates of the white light in CIE 1931 color space may be about (x, y)=(0.304, 0.323). After passing through the two polarizers, the illuminance may be about 571 cd/m². The color coordinates of the white light in CIE 1931 color space may be about (x, y)=(0.318, 0.347). The transmittance of a single polarizer, oriented parallel to the direction of linear polarization, may be about 89%. The loss due to reflection from the polarizer may be about 8%.

After passing light through a polarizer oriented to pass p-polarized light, the illuminance may be about 243 cd/m². After passing light through a polarizer oriented to pass s-polarized light, the illuminance may be about 224 cd/m². Thus, the ratio of p-polarized light to s-polarized light may be about 1.08.

In another specific embodiment, a 1.8 inch LCD is used in the HUD and has an active area of 40.90×20.45 mm. The virtual image may provide a brightness of greater than 10,000 cd/m² for a white image viewed directly, and greater than 650 cd/m² for a white image viewed through polarized sunglasses. Thus, the fraction of light emitted as p-polarized that reaches the driver may be 6.5% or more. The angle of incidence of the light reaching the windshield may be about 64°. The index of refraction of the glass in the windshield may be about 1.52. At a 60 degree angle of incidence, the windshield may reflect about 36.7% of the s-polarized light and about 0.305% of the p-polarized light. At a 65 degree angle of incidence, the windshield may reflect 47.1% of the s-polarized light and 2.46% of the p-polarized light. Thus, after reflection, the fraction of p-polarized light is reduced by a factor 4.9% (2.46/(2.46+47.1)) relative to the s-polarized light. Consequently, the ratio of (p-polarized intensity)/(s-polarized intensity) exiting the LCD may be about 1.33 (6.5%/4.9%). Thus, the angle of the linear polarization may be rotated by about 49°. This may be done with one sheet of half-wave retarder film rotated by 49°/2=24.5°. It may also be done with three sheets of linear polarizer material, each rotated by 16.3°. The half-wave retarder solution may transmit all of the incident power. The three-polarizer solution may transmit about 78% of the incident power.

FIG. 3 is a flow chart of one embodiment of a head up display method 300 of the present invention. In a first step 302, a head up display module including a picture generation unit and a plurality of linear polarizers arranged in a stack is provided. For example, HUD module 12 includes a PGU and a polarizing device 18. Polarizing device 18 includes a polarization rotator having a stack of three linear polarizers or plane polarizers 24a-c.

Next, in step 304, light is emitted by use of the picture generation unit. For example, PGU may be in the form of LCD 16 transmitting light 23 to polarizing device 18.

In a next step 306, the light from the picture generation unit is passed sequentially through each of the linear polarizers to thereby change a linear polarization direction of the light. For example, two polarizers may be used. The first polarizer may be rotated 23 degrees, and the second polarizer may be rotated 46 degrees. Thus, the polarization direction of the light after passing through both polarizers may be rotated 46 degrees.

In a final step 308, the light that has passed through the linear polarizers is reflected off of a windshield such that the reflected light is visible to a human driver of a motor vehicle as a virtual image. For example, light 23 from LCD 16 may be polarized by polarization rotator 18, and reflected by mirrors 20, 22 and windshield 14 toward a user 34. Light 23 may appear to user 34 as a virtual image 36 even when user 34 is wearing polarized sunglasses.

Different numbers of polarizers may be used within the scope of the invention. Using fewer polarizer layers increases the loss in intensity caused by light that is transmitted through one polarizer not being transmitted through the subsequent polarizer. Using many polarizers increases the loss associated with absorption of light by the polarizers.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, comprising:
 a head up display module including:
  a picture generation unit configured to emit a light field; and
  a plurality of linear polarizers arranged in a stack, a first of the linear polarizers being configured to receive the light field from the picture generation unit, a last of the linear polarizers being configured to emit the light field, the linear polarizers being configured to change a linear polarization direction of the light field, wherein each pair of adjacent said linear polarizers has a respective gap between the pair of adjacent said linear polarizers, each said gap being filled with optically transparent material, and the optically transparent material matches an index of refraction of adjacent said linear polarizers; and
 a windshield configured to reflect the light field from the last linear polarizer such that the reflected light field is visible to a human driver of the motor vehicle as a virtual image.

2. The head up display arrangement of claim 1 wherein respective polarization directions of the linear polarizers are oriented at approximately a same nonzero incremental angle.

3. The head up display arrangement of claim 1 wherein each of the linear polarizers has a planar shape, and the linear polarizers are parallel to each other.

4. The head up display arrangement of claim 1 wherein said linear polarizers comprise plastic film.

5. The head up display arrangement of claim 1 wherein said picture generation unit comprises a liquid crystal display.

6. The head up display arrangement of claim 1 wherein the plurality of linear polarizers comprise at least three linear polarizers.

7. A head up display method, comprising:
 providing a head up display module including a picture generation unit and a plurality of linear polarizers arranged in a stack, wherein each pair of adjacent said linear polarizers has a respective gap between the pair of adjacent said linear polarizers, each said gap being filled with optically transparent material, and the optically transparent material has an index of refraction that matches an index of refraction of adjacent said linear polarizers;
 emitting light by use of the picture generation unit;
 passing the light from the picture generation unit sequentially through each of the linear polarizers to thereby change a linear polarization direction of the light; and
 reflecting the light that has passed through the linear polarizers off of a windshield such that the reflected light is visible to a human driver of a motor vehicle as a virtual image.

8. The method of claim 7 wherein respective polarization directions of the linear polarizers are oriented at approximately a same nonzero incremental angle.

9. The method of claim 7 wherein each of the linear polarizers has a planar shape, and the linear polarizers are parallel to each other.

10. The method of claim 7 wherein said linear polarizers comprise plastic film.

11. The method of claim 7 wherein said picture generation unit comprises a liquid crystal display.

12. A head up display arrangement for a motor vehicle, comprising:
 a head up display module including:
  a picture generation unit configured to emit light; and
  a plurality of linear polarizers having optically transparent material between adjacent ones of said linear polarizers, wherein the optically transparent material matches an index of refraction of adjacent said linear polarizers, the linear polarizers being configured to:
   receive the light from the picture generation unit;

sequentially change a linear polarization direction of the received light; and emit the light with a changed linear polarization direction; and a windshield configured to reflect the light from the linear polarizers such that the reflected light field is visible to a human driver of the motor vehicle as a virtual image.

13. The head up display arrangement of claim 12 wherein respective polarization directions of the linear polarizers are oriented at approximately a same nonzero incremental angle.

14. The head up display arrangement of claim 12 wherein each of the linear polarizers has a planar shape, and the linear polarizers are parallel to each other.

15. The head up display arrangement of claim 12 wherein said linear polarizers comprise plastic film.

16. The head up display arrangement of claim 12 wherein said picture generation unit comprises a liquid crystal display.

\* \* \* \* \*